I. N. PYLE.
WHEEL-TIRE.

No. 189,386. Patented April 10, 1877.

WITNESSES:
Francis McArdle
J. H. Scarborough

INVENTOR:
I. N. Pyle
BY
[signature]
ATTORNEYS.

UNITED STATES PATENT OFFICE.

ISAAC N. PYLE, OF DECATUR, INDIANA.

IMPROVEMENT IN WHEEL-TIRES.

Specification forming part of Letters Patent No. 189,386, dated April 10, 1877; application filed March 19, 1877.

*To all whom it may concern:*

Figure 1:
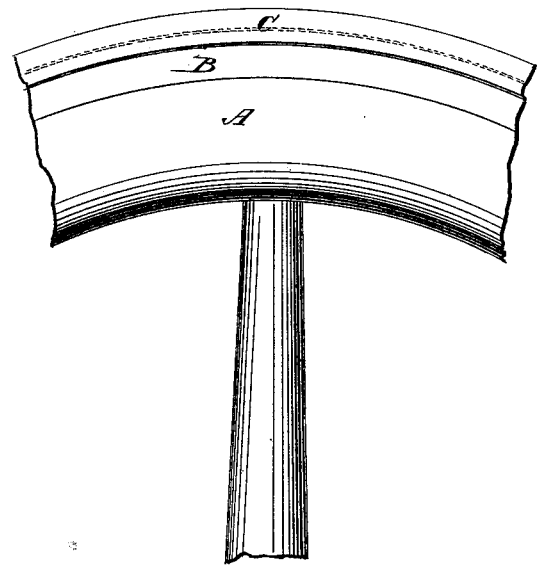
Figure 2:
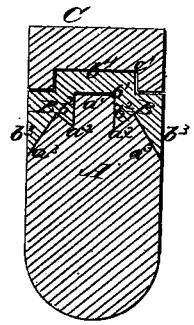

Be it known that I, ISAAC N. PYLE, of Decatur, in the county of Adams and State of Indiana, have invented a new and useful Improvement in Wagon-Tire, of which the following is a specification:

Figure 1 is a side view of a portion of the rim of a wheel to which my improved tire has been applied. Fig. 2 is a cross-section of the same.

Similar letters of reference indicate corresponding parts.

The object of this invention is to furnish an improved tire for vehicle-wheels, which shall be so constructed as to hold the wheel firmly together, and prevent the tire from coming off or rattling should the fellies shrink.

The invention consists in the outer tire made with the groove upon its inner surface, and the inner tire made with the tongue upon its outer surface, and the groove and the two pairs of lips upon its inner surface, in combination with the fellies, made with the tongue, the two grooves, and the two bevels upon their face, as hereinafter fully described.

A represents the felly, and B and C the parts of the double tire.

The face of the fellies A has a tongue, $a^1$, formed longitudinally upon it, has its side edges beveled off, and has V-grooves $a^2$ formed in it at the sides of the tongue $a^1$. The inner tire B has a groove, $b^1$, formed in its inner surface to receive the tongue $a^1$ of the fellies A, which groove is made a little smaller than the tongue $a^1$, so that when shrunk upon the wheel it may hug the fellies, and draw them down firmly upon the shoulders of the spokes. Upon the inner surface of the inner tire B, at each side of its groove $b^1$, are formed two lips, $b^2$ $b^3$. The inner lips $b^2$ fit into the grooves $a^2$ of the fellies, and the outer lips $b^3$ fit upon the bevels $a^3$ of said fellies. This arrangement prevents the tire from rattling should the fellies shrink. Upon the outer surface of the inner tire B is formed a tongue, $b^4$, to enter a groove, $c^1$, in the inner surface of the outer tire C, which groove is made a little smaller than the said tongue $b^4$, so that the outer tire C may hug the inner tire B snugly when shrunk upon it, and may draw said inner tire B more firmly down upon the fellies, making the entire wheel firm and strong. This construction leaves the outer edges of the outer tire thick to receive the wear.

Having thus described my invention, I claim as new and desire to secure by Letters Patent—

The outer tire C, made with the groove $c'$ upon its inner surface, and the inner tire B, made with the tongue $b^4$ upon its outer surface, and the groove $b^1$ and the two pairs of lips $b^2$ $b^3$ upon its inner surface, in combination with the fellies A, made with the tongue $a^1$, the two grooves $a^2$, and the two bevels $a^3$ upon their face, substantially as herein shown and described.

ISAAC. N. PYLE.

Witnesses:
L. D. PHELPS,
JACOB FORLOW.